No. 673,902. Patented May 14, 1901.
J. B. EIDEL & G. HARTMANN.
ROTARY ENGINE.
(Application filed Nov. 20, 1900.)
(No Model.)
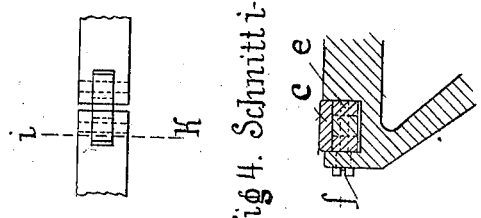
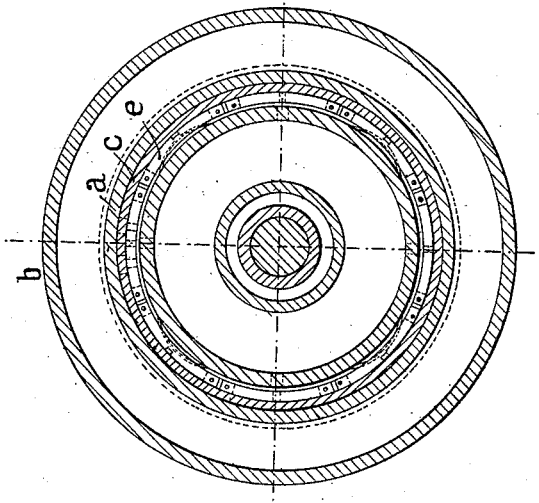
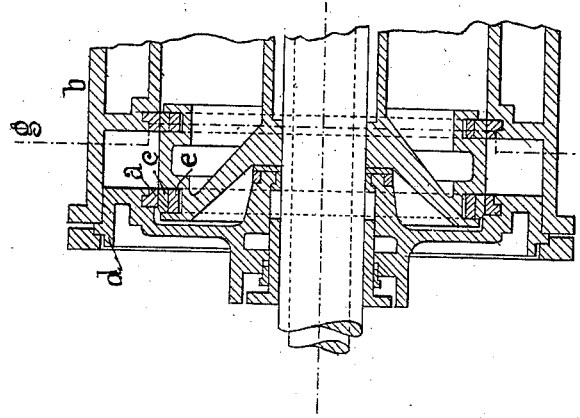
Witnesses:
Inventors.

UNITED STATES PATENT OFFICE.

JOHANN BAPTIST EIDEL, OF KEHL, AND GEORG HARTMANN, OF STRASBURG, GERMANY.

ROTARY ENGINE.

SPECIFICATION forming part of Letters Patent No. 673,902, dated May 14, 1901.

Application filed November 20, 1900. Serial No. 37,132. (No model.)

*To all whom it may concern:*

Be it known that we, JOHANN BAPTIST EIDEL, brewery-owner, a subject of the Grand Duke of Baden, residing at Hauptstrasse No. 109, in the city of Kehl-on-the-Rhine, in the Grand Duchy of Baden, and GEORG HARTMANN, engineer, a subject of the King of Bavaria, residing at Steingasse No. 5, in the city of Strasburg, in the Province of Alsace, in the Empire of Germany, have invented certain new and useful Improvements in Packing for Pistons of Rotary Engines, of which the following is a specification.

This invention relates to packing for piston-rings, and has for its object various improvements in the construction of the same.

It is a fact that great difficulty is experienced in machines with rotary pistons, especially when the pressure of the motive fluid or medium is very high, to make the packing of the piston tight toward the wall and cover of the cylinder. If the packing is not secure and durable, a blowing through will sooner or later occur between the piston and cylinder or the cover of the cylinder, respectively, and consequently a loss of the pressing medium will take place, so that the engine cannot work economically.

According to the present invention insertion-rings, secured against revolution in their seats, are employed, toward which rings self-tightening piston-rings elastically press, said rings being likewise secured against turning in the seat and supported by washers in their tightening action, whereby a very tight and lasting packing is attained. In order that the washers may assist by the centrifugal force the tightening action, such washers consist of a number of segments, which are fastened together by means of longitudinally-slotted links and also bolts, so that the rings may expand in the direction of the periphery from each other, according to the wear of the said piston-rings, and therefore assist such rings in their tightening action under the influence of the centrifugal force. If it is desired, a predetermined specific surface-pressure between the piston and the tightening packing-rings in proportion to the angular velocity of the piston and the means of the washers can be attained. As the wear is also increased if the specific pressure becomes higher, insertion-rings are employed, which are easily exchangeable and very cheap.

Figure 1 shows an example of the new packing with the cylinder and piston in longitudinal section. Fig. 2 is a cross-section through the packing-rings. Fig. 3 shows the combination of two links of such rings $e$, and Fig. 4 shows the manner of inserting the bolts in the said ring $e$.

As represented in the drawings, a rotary engine is assumed, which acts as compound or explosion engine, having two cylindrical piston parts of different lengths guided in corresponding parts of the cylinder. Against the walls of the cylinder-chambers outwardly-leading slide-valves (not shown in the drawings) press, said slide-valves at a predetermined time yielding to the studs on each half of the piston (likewise not represented) in known manner. Spring-rings $a$ are inserted in circular grooves of the cylinder-casing $b$ or in grooves of the cover $d$, respectively, and secured against turning in these grooves. The insertion-rings may consist of cast-iron, steel, or any other metal alloy. Weak piston-rings $c$ of the same material, likewise secured against turning on their seat, are inserted in adapted grooves of the piston. The rings $c$ press with their outer surface against the inner face of the rings $a$ and form by their self-tightening action, assisted by the centrifugal force of the washers $e$, a simple, durable, and secure packing at the said points.

The washers $e$ consist of a number of ring parts that are connected together by links provided with longitudinally-slotted holes and also bolts $f$, Figs. 2 and 3. Under the influence of the centrifugal force the several parts of the washer-rings $e$ can expand from each other in the direction of the periphery, and thereby support the piston-rings $c$ in their tightening action.

The before-described packing for rotary engines is designed for the purpose of attaining the same result in practice as engines having a to-and-fro movement of the piston allow. The repair of such engines will thereby be reduced and an easy and cheap exchange of the packing-rings rendered possible.

What we claim, and desire to secure by United States Letters Patent, is—

An improved piston-packing for rotary engines consisting in elastic insertion-rings placed in circular grooves of the cylinder or the cylinder-cover respectively, said rings being secured from turning in their seats, against which self-tightening weak piston-rings press, the latter rings being likewise secured from turning in their seats by circular grooves of the rotating piston and at the same time assisted in their tightening action by the centrifugal force by means of washers composed of several links, as set forth.

In witness whereof we have hereunto signed our names this 6th day of November, 1900, in the presence of two subscribing witnesses.

JOHANN BAPTIST EIDEL.
GEORG HARTMANN.

Witnesses:
FRANZ EMIL HENN,
MAX ADLER.